United States Patent Office 2,924,624
Patented Feb. 9, 1960

2,924,624

**PROCESS FOR PREPARING CARBON TETRAFLUO-
RIDE OF AT LEAST 90 PERCENT PURITY**

William O. Forshey, Jr., New Castle, Del., assignor to
E. I. du Pont de Nemours and Company, Wilmington,
Del., a corporation of Delaware No Drawing. Application September 3, 1957
Serial No. 681,451

15 Claims. (Cl. 260—653)

This invention relates to an improved process of preparing carbon tetrafluoride in essentially pure form.

Carbon tetrafluoride is an important industrial chemical which finds uses as refrigerant liquid, dielectric fluid and ingredient of aerosol compositions, e.g., insecticidal compositions. It is also the starting material in a new process, described in U.S. Patent 2,709,192, of synthesizing the technically important tetrafluoroethylene.

Very few methods are available for preparing carbon tetrafluoride from inexpensive starting materials. A new synthesis of chlorofluorocarbons from carbon, chlorine and certain fluorides, e.g., hydrogen fluoride and alkali metal fluorides, has been recently described in U.S. Patent 2,709,184. This process gives carbon tetrafluoride, but only in low conversions and as a by-product mixed with larger amounts of chlorofluorocarbons.

It was not to be expected from the teachings of this patent that a certain selection from the class of reactants shown therein under special and critical reaction conditions wherein said selected fluoride reactant is maintained in the molten state and in intimate contact with the other reactants would change the course of the reaction and lead to a result radically different from that disclosed. This, however, has now been accomplished through the present invention whereby a halocarbon product containing at least 90% of carbon tetrafluoride, i.e., nearly pure carbon tetrafluoride, is obtained in excellent conversions from inexpensive reactants.

It is an object of this invention to provide an improved process for preparing carbon tetrafluoride of a high degree of purity. A further object is to provide an improved one-step process for preparing carbon tetrafluoride in excellent conversions from inexpensive reactants. Other objects will appear hereinafter.

These and other objects are accomplished by the present invention wherein carbon tetrafluoride is prepared by a process which comprises bringing into intimate contact under atmospheric pressure a fluoride of an alkali metal of atomic number 11 to 19, inclusive (i.e., sodium or potassium fluoride), in the molten state and at a temperature between 1200° C. and below the boiling point of the alkali metal fluoride, with carbon and chlorine thereby forming alkali metal chloride and carbon tetrafluoride, the carbon being used in amounts of at least 0.25 g./atom per mole of alkali metal fluoride, the molar ratio of the total chlorine to the alkali metal fluoride being between 0.3:1 and 0.5:1, and preferably between 0.4:1 and 0.5:1, and maintaining the reactants in intimate contact at the reaction temperature for a period of at least 1 and not more than 15 seconds and continuing the process until the molar ratio of alkali metal chloride formed to unreacted alkali metal fluoride in the reaction mixture is at least 3:2 and preferably at least 4:1.

A preferred method of obtaining the intimate contact and desired reaction between the reactants is by passing a stream of chlorine gas together with sodium fluoride or potassium fluoride in the molten state into intimate contact with carbon at a temperature between 1200° C. and below the boiling point of the sodium fluoride or potassium fluoride. Another preferred method of obtaining the intimate contact and desired reaction between the reactants is by passing a stream of chlorine gas into intimate contact with a mixture of carbon and sodium fluoride or potassium fluoride in the molten state at a temperature between 1200° C. and below the boiling point of the sodium or potassium fluoride. Under the special and critical reaction conditions herein disclosed, there is obtained as the resulting product a halocarbon product containing at least 90% of carbon tetrafluoride on a molar basis.

Since carbon tetrafluoride constitutes all or nearly all of the halocarbon reaction product, the process can be essentially represented by the equation

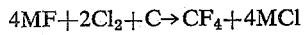

$$4MF + 2Cl_2 + C \rightarrow CF_4 + 4MCl$$

wherein M stands for an alkali metal of atomic number 11 to 19, i.e., sodium or potassium. When operating under the stated critical conditions, the organic, alkali-insoluble, fluorine-containing reaction product contains at least 90% of carbon tetrafluoride on a molar basis, generally over 95%, and under optimum conditions, it is essentially entirely carbon tetrafluoride. Although some chlorotrifluoromethane, occasionally with trace amounts of the other chlorofluoromethanes, may be formed along with the desired product carbon tetrafluoride, these are only in very small amounts, not exceeding at the most 10%. This small proportion of chlorotrifluoromethane does not interfere with the principal uses of carbon tetrafluoride mentioned above. Thus, the reaction product of the present process consists essentially or almost entirely of carbon tetrafluoride.

Sometimes, the reaction product contains small amounts of inorganic by-products (e.g., silicon tetrafluoride, hydrogen chloride and carbon dioxide), these being formed from moisture and impurities which are difficult to remove from the reactants. These by-products, which are present in only minor proportions, can readily be separated from the carbon tetrafluoride by washing the reaction product with water or aqueous alkali. This treatment also removes the unreacted chlorine, if any, although, if desired, such unreacted chlorine can be easily separated by a simple distillation from the carbon tetrafluoride and recovered.

By using the reactants in the prescribed ratio and maintaining them in contact at reaction temperature until the prescribed end point is reached, most of the chlorine employed (under optimum conditions, all or nearly all of it) is utilized and conversion of the alkali metal fluoride reaches the point (at least 60%, preferably over 80%) where it is unnecessary for economical operation to recover the unchanged metal fluoride. These facts, coupled with the already-mentioned fact that carbon tetrafluoride is obtained essentially pure upon a simple water, or alkali, scrubbing of the reaction product, make this synthesis highly economical and practical, and well adapted to industrial scale operation.

Either sodium fluoride or potassium fluoride can be used with equally good results. Lithium fluoride, on the other hand, is much less reactive and leads to much lower conversions to carbon tetrafluoride. Commercial grades of sodium and potassium fluoride can be used without purification. It is only necessary that they be substantially anhydrous since the presence of water vapor in the system lowers the conversions. Similarly, any good industrial grade of chlorine can be used.

Instead of using the preformed alkali metal fluorides in this process, it is possible to generate them in situ by using as the starting materials the corresponding fluosilicates, i.e., potassium fluosilicate, $K_2SiF_6$ or sodium fluosilicate, $Na_2SiF_6$. As is known, these fluosilicates decompose at elevated temperatures to give silicon tetrafluoride and the alkali metal fluoride, in accordance with the equation $$M_2SiF_6 \rightarrow SiF_4 + 2MF$$

where M stands for potassium or sodium. Thus, these alkali metal fluosilicates are equivalent to the alkali metal fluorides in the process of this invention. Their use (which is illustrated in Example IV below) involves, of course, the formation of large amounts of silicon tetrafluoride, which is found among the gaseous reaction products. If it is desired to recover the silicon tetrafluoride as such, it can be separated from the halocarbon product by distillation or freezing. It is generally more economical to separate it by scrubbing the gaseous product with aqueous sodium or potassium hydroxide, whereby it is reconverted to alkali metal fluosilicate while at the same time the halocarbon product is freed from all acidic by-products.

Any form of carbon, whether amorphous or crystalline, is suitable. Thus, there can be used anthracite, graphite, charcoal or the various forms of carbon black. Smaller amounts of by-products are obtained when the carbon is as free as possible from hydrocarbon impurities and silicon. However, the carbon need not be rigorously pure. The reactor is normally constructed of carbon (graphite), this being one of the very few materials capable of withstanding the action of chlorine at the high temperatures involved, and in such a case part at least of the reactant carbon can be supplied by the walls of the reaction vessel or by the graphite inlet tube and gas diffuser. It is desirable, of course, to have additional carbon present in order to minimize attack of the graphite equipment.

In order to achieve maximum utilization of both the chlorine and the alkali metal fluoride, it is necessary to employ these reactants in the specified range of proportions, that is, in amounts such that the molar ratio of the chlorine to the alkali metal fluoride is between 0.3:1 and 0.5:1, and preferably between 0.4:1 and 0.5:1. By this is meant the molar ratio of the total chlorine to the total alkali metal fluoride, rather than the ratio of the two reactants in the system at any given time. By observance of this ratio, conversions to halocarbons, based on the chlorine, are at least 80% and often at least 90%, and can even be quantitative under optimum conditions.

It is further necessary to maintain the reactants in intimate contact at reaction temperature by continuing the process until at least 60%, and preferably at least 80% of the alkali metal fluoride has been converted to alkali metal chloride. Otherwise expressed, intimate contact is maintained to continue the reaction until the molar ratio of alkali metal fluoride to alkali metal chloride in the reaction mixture is at least 3:2 and preferably at least 4:1. However, it is not generally desirable to continue the reaction beyond the point where this ratio is about 8:1 since the salt mixture is then largely alkali metal chloride, and it becomes difficult to maintain efficient contact between the chlorine and the small remaining amount of alkali metal fluoride. The end point can be readily determined by titration of either the chloride or fluoride ion in a sample of the reaction mass.

The actual contact time between the reactants, whether the process is carried out batchwise or continuously, is such as to achieve the above-mentioned ratio of chloride to fluoride in the reaction mass. Since it depends in large part on the form and size of the equipment, it cannot be stated in absolute terms. In general, however, it can be said that the chlorine should be in contact with the molten alkali metal fluoride and the carbon for at least one second and normally at least two seconds. Contact times exceeding about 15 seconds are not necessary since the conversions are not increased thereby and the capacity of the equipment is decreased.

The carbon should be used in at least the amount theoretically required, e.g., in amounts of at least 0.25 g./atom per mole of alkali metal fluoride. Beyond that, the quantity of carbon present is not critical, although it is unnecessary to use more than about 0.5–1 g./atom of carbon per mole of alkali metal fluoride. The carbon can be used either in finely divided form or in coarser particles, e.g., of 1–10 mm. in diameter.

The reaction temperature is a critical factor in the successful operation of this process. It is first of all necessary that the alkali metal fluoride be molten, but this is not sufficient. Even when this condition is fulfilled, the reaction gives poor conversions at temperatures below 1000° C. At or about 1000° C., conversions to halocarbons, based on the chlorine, become good but the reaction product is predominantly chlorotrifluoromethane. As the temperature increases the ratio of carbon tetrafluoride to chlorotrifluoromethane increases, but it is only at or about 1200° C. that this ratio reaches the desired 9:1, i.e., that the reaction product contains at least 90% of carbon tetrafluoride on a molar basis. Further increase of the reaction temperature gives still higher ratios and, at or near 1400° C., the halocarbon product is essentially all carbon tetrafluoride, and the conversion of the chlorine is nearly quantitative.

While the minimum reaction temperature necessary to obtain nearly pure carbon tetrafluoride is 1200° C., it is also necessary in the operation of this process to remain below the boiling point of the alkali metal fluoride. At atmospheric pressure, this is about 1700° C. for sodium fluoride and about 1500° C. for potassium fluoride. These values can be altered somewhat by operating either at subatmospheric or at superatmospheric pressures, but in general the process is preferably conducted at or near atmospheric pressure.

The optimum temperature range for the highest concentration of carbon tetrafluoride in the halocarbon product is that between 1350 and 1450° C. Other optimum conditions are a molar ratio of total chlorine to total alkali metal fluoride between 0.4:1 and 0.5:1, and continuance of the reaction until the ratio of alkali metal chloride to alkali metal fluoride in the reaction mass is between 4:1 and 8:1.

In one mode of operation, batch-type equipment is used in which chlorine is passed, at or near atmospheric pressure or, if desired, at higher or lower pressures, through a mixture of molten alkali metal fluoride and carbon. Any suitably designed apparatus can be used. In Examples I and II, the apparatus consisted of a graphite crucible suspended from a water-cooled copper head inside a water-cooled or air-cooled quartz vessel placed within an induction furnace, the crucible being surrounded by graphite powder insulation inside the quartz vessel. Chlorine, mixed with a carrier gas (the use of a carrier gas is convenient, though by no means essential), was led into the crucible through an inlet tube made of impervious graphite to prevent premature diffusion of the chlorine and terminating in a porous graphite diffuser near the bottom of the crucible. Above the point where it entered the copper head, the graphite inlet tube was connected to the source of chlorine and carrier gas through a water-cooled copper tube provided with a sight glass permitting optical pyrometric measurement of the inside temperature. The gaseous reaction product left the reactor through an outlet in the copper head holding the graphite crucible and was led to a collection system consisting of traps cooled down to —195° C.

To operate using the above-described apparatus, the graphite crucible is charged with the alkali metal fluoride and the carbon to be used as reactants, and the gas outlet is connected to the cold traps. The entire system is evacuated while the crucible is heated inductively. When the reaction temperature is reached and the alkali metal fluoride has melted, the system is brought back to atmospheric pressure by introduction of an inert gas such as nitrogen, helium or argon and the flow of chlorine at the rate of about 10–20 g. per hour, if desired mixed with a carrier gas (e.g., nitrogen, helium, argon), is begun. The chlorine comes in contact wtih the other reactants after bubbling out of the porous graphite diffuser, which is below the surface of the molten alkali metal fluoride. The product from the reactor is vented for some time, e.g., 10 to 30 minutes, while steady conditions are being established. The product is then collected in the cold traps where it condenses, and it is transferred at the end of the reaction to a stainless steel cylinder for analysis and for distillation.

In another mode of practicing the process, illustrated in Example III, a continuous flow reactor is used. For example, such a reactor may comprise a vertical tube of impervious graphite packed in the center with chips of graphite or amorphous carbon and held in a water-cooled jacket, where the graphite tube is surrounded by carbon black insulation. The tube and packing therein of chips of graphite or amorphous carbon are heated to reaction temperature by means of an induction furnace. Solid sodium or potassium fluoride, if desired mixed with finely divided carbon or graphite, is introduced through a screw injector into the top portion of the tube and falls onto the packing of chips of graphite or amorphous carbon where it melts. Chlorine is simultaneously introduced at the required rate at the top of the graphite tube and passed together with the molten alkali metal fluoride into intimate contact with the carbon in the center section of the tube. The solid effluent from the reaction zone is collected at the bottom of the graphite tube in a water-cooled receiver, and the gaseous products are removed through a side arm to a cold trap collection system.

The invention is illustrated in greater detail in the examples which follow. In these examples, the composition of the total gaseous reaction product, without preliminary washing or other purification, was determined by the rapid and accurate method of infrared spectral analysis. This method gives directly, in moles percent, the amount in the reaction product of carbon tetrafluoride, chlorotrifluoromethane and other halomethanes, if any, and of impurities such as silicon tetrafluoride or hydrogen chloride, these latter being present only in small or trace amounts. Unreacted chlorine, if any is present, which does not absorb in the infrared, was determined by difference. Check experiments in which chlorine was determined iodometrically showed that the differential method gave the correct amount of chlorine present within the limits of accuracy of infrared analysis. Similarly, the total amount of chlorine used and the conversions were calculated from the composition of the reaction product as determined by infrared analysis.

EXAMPLE I

A mixture of 100 g. of sodium fluoride and 12 g. of graphite powder was heated to 1400° C. in a batch-type graphite reactor of the kind described above. A gas stream composed of chlorine at an average rate of approximately 17 g. per hour and helium at approximately 4 liters per hour was passed through the mixture at 1400° C. for 4 hours. The contact time was 2.2 seconds. To follow more closely the course of the reaction, the gaseous reaction product was collected and analyzed in two fractions, the first at the end of two hours and the second at the end of four hours. The results are shown in the following table, in which the conversions are based on the total chlorine passed through the apparatus and the yields are based on the chlorine actually consumed.

*First and second hours*

| Product | Weight, g. | Conversion, percent | Yield, percent |
| --- | --- | --- | --- |
| $CF_4$ | 23.5 | 98.2 | 98.2 |
| $CF_3Cl$ | 0.29 | 0.9 | 0.9 |

The product contained no chlorine and only trace amounts of HCl, $SiF_4$ and $CO_2$.

*Third and fourth hours*

| Product | Weight, g. | Conversion, percent | Yield, percent |
| --- | --- | --- | --- |
| $CF_4$ | 18.5 | 70.8 | 93.1 |
| $CF_3Cl$ | 1.2 | 3.8 | 5.0 |

The product contained some unreacted chlorine and small amounts of $SiF_4$, HCl, $CF_2Cl_2$ and $COF_2$.

These products correspond to 45.5% conversion of the sodium fluoride to halocarbons during the first two hours and 82.5% conversion of the sodium fluoride at the end of four hours, corresponding to a 4.7:1 molar ratio of sodium chloride to sodium fluoride in the reaction mass. The molar ratio of total chlorine to total sodium fluoride during the four hours was 0.47:1. It will be seen further that conversion to halocarbons, based on the chlorine, was over 87%, and that the halocarbon reaction product contained 97% on a molar basis (96% on a weight basis) of carbon tetrafluoride, the remainder being chlorotrifluoromethane.

EXAMPLE II

Using a batch-type graphite reactor as in Example I, a mixture of 100 g. of potassium fluoride and 12 g. of graphite powder was heated to 1375 to 1400° C., and a gas stream composed of chlorine at the rate of 12 to 15 g. per hour and helium at the rate of 5 liters per hour was passed through the mixture at that temperature. With the apparatus used, the contact time was 2.4 seconds. The reaction product was collected in three fractions: the first hour, the second hour, and a final 35 minutes. The results are as follows, the conversions being based on the chlorine:

|  | Product Composition | Conversion, percent |
| --- | --- | --- |
| First hours | $CF_4$, 10.31 g. | 100 |
| Second hour | $CF_4$, 9.13 g. | 100 |

These products contained no unreacted chlorine, only trace amounts of $CF_3Cl$ and $SiF_4$, and possible traces of $CO_2$ and COS.

|  | Product Composition | Conversion, percent |
| --- | --- | --- |
| Final 35 minutes | $CF_4$, 4.78 g. | 92 |
|  | $CF_3Cl$, 0.06 g. | 1 |
|  | HCl, 0.15 g. | 7 |
|  | $CO_2$, 0.05 g. |  |

This product contained no unreacted chlorine, and only traces of $SiF_4$, COS and $COCl_2$.

Thus, the overall operation gave the following products and conversions:

| Product | Weight, g. | Conversion, percent |
| --- | --- | --- |
| $CF_4$ | 24.22 | 98.3 |
| $CF_3Cl$ | 0.06 | 0.2 |
| HCl | 0.15 | 1.5 |

Since the chlorine was completely consumed, the yields based on unrecovered chlorine were identical with the conversions. Since the total amount of chlorine used was 39.2 g., the molar ratio of total chlorine to potassium fluoride (100 g.) was 0.33:1. The composition of the product indicated that 64% of the potassium fluoride had been converted, and thus the final molar ratio of potassium chloride to potassium fluoride was 64:36 or 1.78:1. The carbon tetrafluoride constituted 99.7% of the halocarbon product on a molar basis.

In comparison, when this experiment was repeated in the same apparatus and under identical conditions, but using lithium fluoride as the source of fluorine, the overall conversion during two hours of operation was only 72%, and the amount of unreacted chlorine in the effluent gas was increasing rapidly after the first hour.

EXAMPLE III

A continuous reactor consisting of a vertical graphite tube as described above was packed with 4 to 8-mesh graphite particles occupying a total volume of 15 cc. The reactor was heated to 1450 to 1500° C., and through the top of it was introduced a gas stream composed of chlorine, at the rate of about 30 g. per hour, and helium, at the rate of about 5 liters per hour. Simultaneously, solid sodium fluoride, 35 to 40-mesh in particle size, was introduced at the top by means of a screw feeder at the rate of 0.875 g. per minute. The sodium fluoride was thus brought into contact with the graphite particles in the tube where it melted, and the chlorine and melted sodium fluoride were passed together into intimate contact with the graphite particles. After operating the reactor under these conditions for 10 minutes, the gaseous product was collected for 30 minutes. It had the following composition:

| Product | Weight, g. | Conversion, percent | Yield, percent |
| --- | --- | --- | --- |
| $CF_4$ | 8.35 | 88.9 | 96.5 |
| $CF_3Cl$ | 0.36 | 3.2 | 3.5 |
| $Cl_2$ | 1.19 | | |

In the above table the conversions are based on the total chlorine introduced, and the yields are based on the chloride actually consumed. The product also contained trace amounts of dichlorodifluoromethane, silicon tetrafluoride and hydrogen chloride.

In this example the molar ratio of chlorine to sodium fluoride fed into the reactor was 0.34:1. The amount of sodium fluoride consumed was 62.4%, that is, the molar ratio of sodium chloride to sodium fluoride in the inorganic reaction product was 62.4:37.6 or 1.66:1. The halocarbon product contained 95.5% of carbon tetrafluoride on a molar basis.

EXAMPLE IV

The graphite tube reactor of Example III was packed with 4 to 8-mesh graphite chips, occupying a volume of about 10 cc., supported by a perforated conical graphite plate. A slow stream of helium was passed through the tube while it was being heated to 1500° C. When this temperature was reached, there was introduced into the reactor, during a period of 25 minutes, 47 g. (0.25 mole) of anhydrous sodium fluosilicate by means of a screw feeder, concurrently with a gas stream composed of 8.2 g. (0.115 mole) of chlorine and helium at the rate of 5 liters/hour. The gaseous product of this reaction, condensed in cold traps, amounted to 23.73 g. It contained, on a molar basis, 20% of carbon tetrafluoride, less than 1% of chlorotrifluoromethane, 10% of hydrogen chloride and 70% of silicon tetrafluoride, and no chlorine. The amount of silicon tetrafluoride present (18.2 g.) indicated that 70% of the sodium fluosilicate had been decomposed to silicon tetrafluoride and sodium fluoride, thus furnishing 0.35 mole of sodium fluoride available for reaction with the carbon and chlorine.

In this example the molar ratio of chlorine to available sodium fluoride was 0.33:1. The molar ratio of sodium chloride to sodium fluoride in the sodium reaction product was approximately 60:40. The conversions, based on the chlorine, were 87% for the carbon tetrafluoride and 2.4% for the chlorotrifluoromethane, and the halocarbon reaction product contained 97.5% of carbon tetrafluoride on a molar basis.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing carbon tetrafluoride which comprises bringing into intimate contact, under atmospheric pressure, a fluoride of an alkali metal of atomic number 11 to 19, in the molten state, at a temperature between 1200° C. and below the boiling point of said alkali metal fluoride, with carbon and chlorine, thereby forming alkali metal chloride and carbon tetrafluoride, said carbon being in amount of at least 0.25 g./atom per mole of said alkali metal fluoride, the molar ratio of the total chlorine to said alkali metal fluoride being between 0.3:1 and 0.5:1, maintaining said reactants in intimate contact for a period of at least 1 and not more than 15 seconds at said reaction temperature and continuing said process until the molar ratio of alkali metal chloride formed to unreacted alkali metal fluoride in the reaction mixture is at least 3:2, and obtaining carbon tetrafluoride of at least 90% purity as the resulting product.

2. A process for preparing carbon tetrafluoride as set forth in claim 1 wherein said fluoride of an alkali metal of atomic number 11 to 19 is sodium fluoride.

3. A process for preparing carbon tetrafluoride as set forth in claim 1 wherein said fluoride of an alkali metal of atomic number 11 to 19 is potassium fluoride.

4. A process for preparing carbon tetrafluoride as set forth in claim 1 wherein said alkali metal fluoride is formed in situ by bringing a fluosilicate of an alkali metal of atomic number 11 to 19 into intimate contact with said carbon and chlorine under the temperature conditions specified in said claim 1.

5. A process for preparing carbon tetrafluoride as set forth in claim 1 wherein said alkali metal fluoride is sodium fluoride and is formed in situ by bringing sodium fluosilicate into intimate contact with said carbon and chlorine under the temperature conditions specified in said claim 1.

6. A process for preparing carbon tetrafluoride which comprises passing a stream of chlorine gas together with a fluoride of an alkali metal of atomic number 11 to 19, in the molten state, into intimate contact, under atmospheric pressure, with carbon at a temperature between 1200° C. and below the boiling point of said alkali metal fluoride, thereby forming alkali metal chloride and carbon tetrafluoride, said carbon being in amount of at least 0.25 g./atom per mole of said alkali metal fluoride, the molar ratio of the total chlorine to said alkali metal fluoride being between 0.3:1 and 0.5:1, maintaining said chlorine gas together with said alkali metal fluoride in intimate contact with said carbon for a period of at least 1 and not more than 15 seconds at said reaction temperature and continuing said process until the molar ratio of alkali metal chloride formed to unreacted alkali metal fluoride in the reaction mixture is at least 3:2, and obtaining carbon tetrafluoride of at least 90% purity as the resulting product.

7. A process for preparing carbon tetrafluoride as set forth in claim 6 wherein said fluoride of an alkali metal of atomic number 11 to 19 is sodium fluoride.

8. A process for preparing carbon tetrafluoride as set forth in claim 6 wherein said alkali metal fluoride is formed in situ by bringing a fluosilicate of an alkali metal of atomic number 11 to 19 together with a stream of chlorine gas into intimate contact with said carbon under the temperature conditions specified in said claim 6.

9. A process for preparing carbon tetrafluoride as set forth in claim 6 wherein said alkali metal fluoride is sodium fluoride and is formed in situ by bringing sodium fluosilicate together with a stream of chlorine gas into intimate contact with said carbon under the temperature conditions specified in said claim 6.

10. A process for preparing carbon tetrafluoride which comprises passing a stream of chlorine gas into intimate contact under atmospheric pressure with a mixture of carbon and a fluoride of an alkali metal of atomic number 11 to 19, in the molten state, at a temperature between 1200° C. and below the boiling point of said alkali metal fluoride, thereby forming alkali metal chloride and carbon tetrafluoride, the carbon in said mixture being in amount of at least 0.25 g./atom per mole of said alkali metal fluoride, the molar ratio of the total chlorine to said alkali metal fluoride being between 0.3:1 and 0.5:1, maintaining said chlorine gas in intimate contact with said mixture of carbon and alkali metal fluoride for a period of at least 1 and not more than 15 seconds at said reaction temperature and continuing said process until the molar ratio of alkali metal chloride formed to unreacted alkali metal fluoride in the reaction mixture is at least 3:2, and obtaining carbon tetrafluoride of at least 90% purity as the resulting product.

11. A process for preparing carbon tetrafluoride as set forth in claim 10 wherein said fluoride of an alkali metal of atomic number 11 to 19 is sodium fluoride.

12. A process for preparing carbon tetrafluoride as set forth in claim 10 wherein said fluoride of an alkali metal of atomic number 11 to 19 is potassium fluoride.

13. A process for preparing carbon tetrafluoride as set forth in claim 1 wherein the molar ratio of the total chlorine to said alkali metal fluoride is between 0.4:1 and 0.5:1 and said reactants are maintained in intimate contact for a period of at least 2 and not more than 15 seconds at a temperature of 1350° C. to 1450° C. and said process is continued until the molar ratio of alkali metal chloride formed to unreacted alkali metal fluoride in the reaction mixture is at least 4:1 and is not more than 8:1.

14. A process for preparing carbon tetrafluoride as set forth in claim 6 wherein the molar ratio of the total chlorine to said alkali metal fluoride is between 0.4:1 and 0.5:1 and said reactants are maintained in intimate contact for a period of at least 2 and not more than 15 seconds at a temperature of 1350° C. to 1450° C. and said process is continued until the molar ratio of alkali metal chloride formed to unreacted alkali metal fluoride in the reaction mixture is at least 4:1 and is not more than 8:1.

15. A process for preparing carbon tetrafluoride as set fort in claim 10 wherein the molar ratio of the total chlorine to said alkali metal fluoride is between 0.4:1 and 0.5:1 and said reactants are maintained in intimate contact for a period of at least 2 and not more than 15 seconds at a temperature of 1350° C. to 1450° C. and said process is continued until the molar ratio of alkali metal chloride formed to unreacted alkali metal fluoride in the reaction mixture is at least 4:1 and is not more than 8:1.

References Cited in the file of this patent
UNITED STATES PATENTS 2,709,184    Muetterties _ _ _ _ _ _ _ _ _ _ _ _ _  May 24, 1955